United States Patent [19]

Cicin-Sain

[11] Patent Number: 4,846,282

[45] Date of Patent: Jul. 11, 1989

[54] MACHINE TO RESTORE RAILWAY ROAD BEDS WITH A CONTINUOUS ENDLESS-CONVEYOR RIDDLE

[75] Inventor: Ivo Cicin-Sain, Bussigny-Laus, Switzerland

[73] Assignees: Danieli & C. Officine Mecchaniche SpA; ITI/CCM Impianti Tecnici Industriale SpA, both of Buttrio, Italy

[21] Appl. No.: 49,030

[22] Filed: May 13, 1987

Related U.S. Application Data

[63] Continuation of Ser. No. 799,834, Nov. 20, 1985, abandoned.

[30] Foreign Application Priority Data

Nov. 23, 1984 [IT] Italy .............................. 83440 A/84

[51] Int. Cl.[4] .............................. A01D 17/04

[52] U.S. Cl. .............................. 171/16; 171/18

[58] Field of Search .............................. 171/16, 17, 18, 127, 171/123, 130, 131; 209/681, 307, 421

[56] References Cited

U.S. PATENT DOCUMENTS

| | | | |
|---|---|---|---|
| 2,015,549 | 9/1985 | Dwyer | 171/18 |
| 2,209,282 | 7/1940 | Rodin | 171/15 |
| 3,199,604 | 8/1965 | Lorenzen et al. | 171/127 X |
| 3,805,895 | 4/1974 | Teigen | 171/15 X |
| 3,957,000 | 5/1976 | Plasser et al. | 171/16 |
| 3,976,142 | 8/1976 | Plasser et al. | 171/16 |
| 4,076,124 | 2/1978 | Taysom et al. | 209/308 X |
| 4,448,257 | 5/1984 | McRae | 171/127 |
| 4,530,403 | 7/1985 | Theurer et al. | 171/16 |
| 4,640,364 | 2/1987 | Theurer | 171/131 X |

FOREIGN PATENT DOCUMENTS

| | | | |
|---|---|---|---|
| 650096 | 1/1965 | Belgium | 171/16 |
| 195712 | 2/1908 | Fed. Rep. of Germany | 171/130 |
| 3120005 | 12/1982 | Fed. Rep. of Germany | 171/130 |
| 679603 | 4/1930 | France | 171/17 |
| 182944 | 8/1966 | U.S.S.R. | 171/127 |
| 677923 | 8/1952 | United Kingdom | 171/16 |
| 1187571 | 4/1970 | United Kingdom | 171/111 |
| 2148989 | 6/1985 | United Kingdom | 171/16 |

*Primary Examiner*—Robert E. Garrett
*Assistant Examiner*—Therese M. Newholm
*Attorney, Agent, or Firm*—Wegner & Bretschneider

[57] ABSTRACT

Machine (10–110) to restore railway road beds with a continuous endless-conveyor riddle, the machine (10–110) comprising a frame (11) on trolleys (12–13), an excavator chain means (19), riddle means (25–125–47) with at least one continuous endless-conveyor riddle (25–126), discharge means (30), means (36–38) to distribute restoration material, and alignment grippers (39–40), in which machine (10–110) the continuous endless-conveyor riddle (25–126) sorts the material with its upper segment alone.

7 Claims, 5 Drawing Sheets

MACHINE TO RESTORE RAILWAY ROAD BEDS WITH A CONTINUOUS ENDLESS-CONVEYOR RIDDLE

This application is a continuation of application Ser. No. 799,834, filed Nov. 20, 1985, now abandoned.

This invention concerns a machine to restore railway road beds with a continuous endless-conveyor riddle. To be more exact, the invention concerns a machine to restore railway road beds which is able to take the material of such road beds from below the railway line in a known manner and to riddle it so as to discard debris which is either of too large or too small a piece size and to re-employ cleaned middlings of the prescribed mesh size.

Such riddling is carried out by a continuous endless riddle, which consists, for instance, of endless chains supporting riddle means such as segments or portions of a mesh.

Embodiments are known which are intended to perform riddling of the ballast forming the railway road bed with removal of material of too large a mesh size (blocks, clips, logs, etc.) and of smalls (earth, mud and clay) and with the recovery of middlings of a suitable size, that is, re-usable materials.

For instance, Swiss Pat. No. 309,855 discloses such a machine, which comprises an endless excavator chain having a system of blades able to lift the material from below the railway line. This recovery system lets the material drop into a hopper from which a conveyor belt takes the material to a vibrator riddle. This vibrator riddle includes at least two riddling stages, which enable the smalls, and therefore unusable materials, generally consisting of earth or other impurities, to be separated. Such separated debris is sent to removal conveyors.

This known machine entails the great drawback of very considerable noise owing to the action of the vibrator; such noise has an adverse effect on the machine operators, and the machine also requires riddling to be carried out in several stages by means of a vibrator riddle and does not permit prior separation of materials of unusable large piece sizes. In particular, large materials such as pieces of sleepers, branches, clips and other objects may be mixed with the ballast and have to be sent to the riddle. Such large materials reduce the efficiency of the riddling. In fact, such large materials can cause problems at the riddle and at the means which discharge materials from the riddle.

Patent DE-C-195,712 discloses a riddle consisting of a series of riddling conveyor belts arranged one within another. Such conveyors include a common tract and then diverge to convey materials of different piece sizes to different discharge means; the conveyors are then re-united but at all times are arranged one within another. This device forms a riddle by itself and is not applied to any machine in particular.

Patent FR-A-2,413,501 discloses a machine equipped with a scraper chain which passes below the rails. This chain delivers materials to a vibrator riddle of a static type, and the re-usable materials are sent once more by a conveyor onto the road bed, while the debris is discharged by another conveyor belt.

Patent GB-A-860,435 discloses a machine which remakes the railway track and comprises means able to remove and reposition the sleepers. The ballast is removed by a series of excavators with bladed chains working by frontal action and positioned below the machine. These excavators work not only between the rails but also outside them. As is obvious, the metalling can only be moved after removal of the sleepers.

Patent BE-A-650,096 discloses a riddle of a type with riddling chains, the riddle being equipped with supplementary chains to bring to the surface pieces which could become jammed in the chain links, thus obviating damage to the pulleys or other like problems. This invention too concerns a riddle opeating on its own without being applied in particular to railway machines.

Patent DE-A-3,120,005 discloses a device to separate materials into pieces of small, medium and large sizes; this separation is performed by riddling chains.

Patent FR-A-2,305,544 discloses a track repair machine with a bladed pick-up chain passing under the railway line. The metalling thus taken is sent to a riddle of a traditional type equipped with riddling grills. The material to be re-used is separated from the debris and sent to a distributor case, which by means of a system of movable partitions can distribute the metalling crosswise to the line as required and in a various manner.

One purpose of the present invention is to improve the working of such type of machine.

Indeed,the invention provides for a direct separation of materials of a large piece size, and such materials are retained while travelling on the conveyor riddle without affecting the continuous discharge of the smalls and of the middlings to be recovered while riddling is in progress. At the end of the riddle path the materials of a large piece size are discharged directly.

In a first embodiment the material brought up by the excavator chain, which is of a known type, is discharged through a hopper, also of a known type, onto the endless conveyor riddle, which takes the larger material unable to pass through the mesh to an end station where such material is discharged onto a removal conveyor; this conveyor may serve processing units such as crushers, which make such material usable.

The recoverable middlings having an intermediate piece size pass through the outer mesh of the continuous riddle and are retained on an inner riddle, which too may be solidly fixed to the chain or conveyor constituting the riddle, or which may be an independent riddle surface.

Instead, the smalls drop through this inner riddle onto a conveyor, by which such smalls are sent to the removal conveyor which also discharges the large sized materials; alternatively the smalls can be discharged separately, whereas the large material may possibly be processed for further use, as we said earlier.

Thus the riddle retains only the middlings to be reused. This fraction of the material with the prescribed mesh size is discharged at a return segment of the endless conveyor riddle. In fact, such middlings to be recovered are allowed to fall from this return segment owing to the force of gravity and drop through the mesh of the outer riddle surface.

Moreover, the reciprocal distancing of the links of the riddle at the bend where they are wound about their transmission pulley facilitates the departure of the middlings.

Such middlings fall onto an appropriate conveyor, by which they are delivered to distributor means; this latter means can lay the middlings in a required, adjustable manner in the central zone of the machine and/or in a lateral zone of the machine.

An essential feature of this invention is therefore the performance of a direct separation of the material having too large a piece size. In this way any ballast which is too big and any foreign bodies such as logs, pieces of sleepers, clips, etc. are separated at the beginning and are discharged at one end of the conveyor riddle without passing through such riddle.

Vibrators positioned along the path of the conveyor riddle are provided to facilitate separation of the middlings and smalls and are chosen so as to impart a constant, necessary amplitude of vibration to a pre-selected portion of the conveyor riddle.

In particular, these vibrators are arranged to be suitably insulated from the structure of the machine, thus reducing or eliminating the transmission of vibrations and therefore also any excessive noisiness of the machine.

The fact that only a desired portion of the conveyor riddle and therefore only a portion of the material being riddled are made to vibrate entails a drastic reduction of the force required for such vibration and therefore a considerable reduction of the noise of the machine and of the vibrations transmitted. This is particularly the case when riddling is halted.

A second embodiment of the invention provides for the employment of a vibrating riddle cooperating with an endless conveyor riddle, which is positioned in a closed ring about the vibrating riddle. In this second embodiment the ballast is brought upwards by the excavator chain in a known manner and is conveyed further by a conveyor belt up to the continuous endless-conveyor riddle which surrounds the vibrating riddle. Such endless conveyor riddle retains the material of a large piece size and discharges it terminally by the force of gravity, such large material being then removed by known means, such as a conveyor.

The middlings and the smalls drop onto the vibrating riddle, which consists of only one riddling stage and is therefore very light and not noisy. This riddle will therefore comprise only one vibrating mesh or surface, the mesh size of which is chosen to suit the minimum size of the middlings to be recovered. This vibrating riddle retains the middlings, which slide, owing to the slope of the riddle, towards distributor means that deposit such middlings at the center or at the sides of the road bed as required.

Instead, the smalls pass through the lower branch of the endless conveyor riddle without being withheld, such conveyor riddle branch passing below the vibrating riddle, and lastly reach a conveyor which delivers them to the removal conveyor. Such removal conveyor discharges the large size material and the smalls.

The smalls may possibly be discharged separately from the large size material.

In this second embodiment the vibrations imparted to the vibrating riddle are of a low intensity owing to the light structure of the vibrating riddle; moreover, the vibrating riddle is suitably insualted so as to obtain a low transmission of vibrations to the frame of the machine and to the rails.

According to the invention the continuous riddle can be moved forward in jerks or intermittently so as to obtain the desired offtake of material in a manner analogous to that obtained by means of vibrations.

The invention also provides for the continuous endlessconveyor riddle to have a variable speed so as to be able to adjust the speed of movement to suit the time needed for optimum separation of the material along the travel of the conveyor. In fact, such separation time varies according to the nature and dampness of the smalls (earth, mud, clay, etc.).

A first advantage of the invention is that it arranges for direct separation of the materials of a larger piece size picked up by the excavator chain.

A second advantage of the invention is that such materials of a larger piece size do not pass through the riddle; it is therefore possible to employ a riddle having a modest intensity of vibration and therefore producing little noise. Moreover, the possibility of blockages, jamming or accidental damage to the apparatus by such materials of larger sizes is obviated.

Another advantage of the invention lies in the noteworthy structural and constructional simplicity of the machine and the simplicity of actuation and maintenance.

This invention is therefore embodied in a machine to restore railway road beds with a continuous endless-conveyor riddle, the machine comprising a frame on trolleys, an excavator chain means, riddle means with at least one continuous endless-conveyor riddle, discharge means, means to distribute restoration material, and alignment grippers, the machine being characterized in that the continuous endless- conveyor riddle sorts the material with its upper segment alone.

We shall describe hereinafter some preferred embodiments of the invention as non-restrictive examples with the help of the attached figures, in which:

FIG. 1 gives a side view of a first embodiment of the invention;

FIG. 2 shows a side view of a detail of FIG. 1;

FIG. 3 gives a view along the section A—A of FIG. 2;

FIG. 4 gives a view from above of the discharge system for smalls;

FIG. 5 shows a side view of another embodiment of the invention;

FIG. 6 gives a side view of a detail of FIG. 5 comprising the riddle means;

Figure 1:
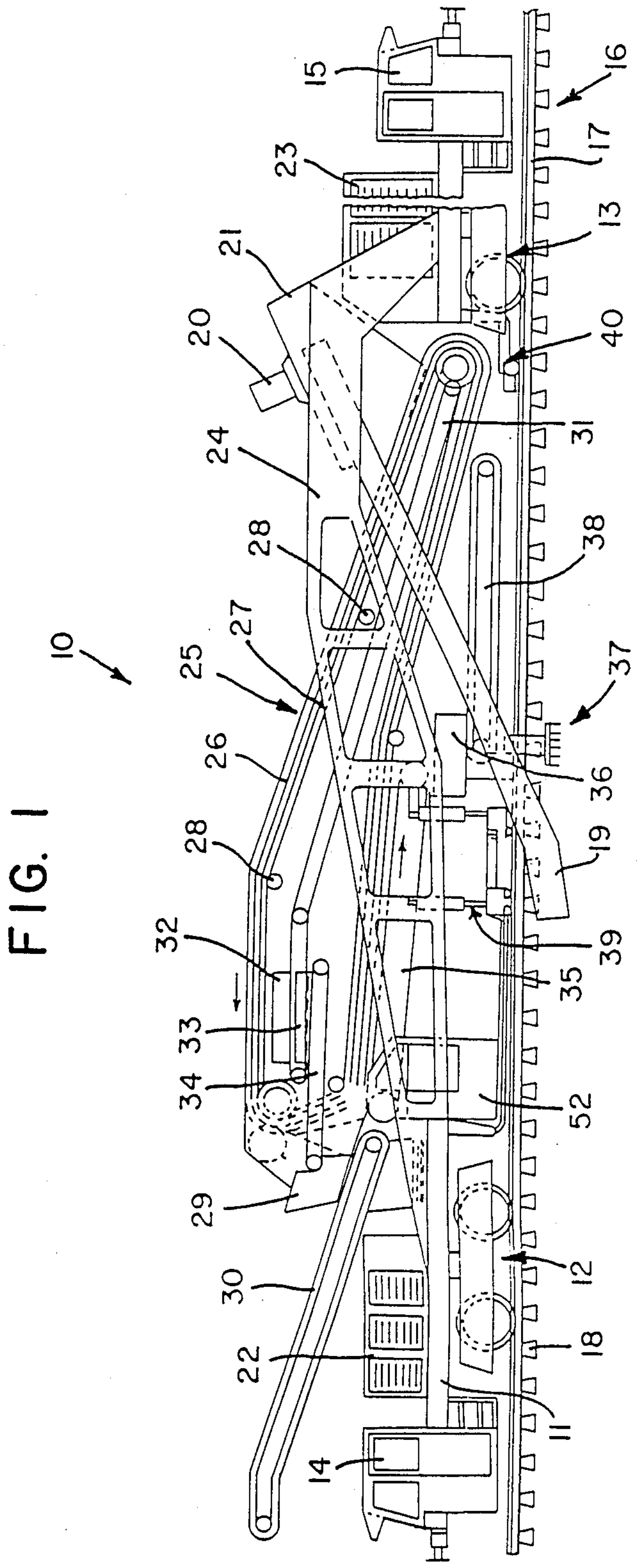

FIG. 1 shows a first embodiment of the invention, in which a machine 10 to restore railway road beds comprises a frame 11 supported on a front trolley 12 and rear trolley 13 in this example. Two cabs 14–15 to control movement of the machine along the railway line are provided at the ends of the machine 10; an intermediate cab 52 is included for the machine operator. The figure shows a railway line 16 with rails 17 and sleepers 18.

The machine 10 comprises in a known manner an excavator chain 19 driven by a motor unit 20, of which the turret can be seen, and equipped with appropriate entraining blades. As is known, such chain 19 has two oblique lateral branches converging at the motor unit 20 and a transverse run which passes under the line 16. The rails 17 attached to the sleepers 18 are kept lifted by a lifting and lateral-displacement device 39 at the position of such transverse run. The device 39 can be suitably positioned and is already known.

The lateral branches of the excavator chain 19 are enclosed in appropriate casings. As is known, the chain 19 has the task of withdrawing from below the line 16 the material forming the railway bed, at the required depth so as to move such material to the riddle.

The material taken by the excavator chain 19 is sent to a hopper 21, from which it falls onto an endless-conveyor riddle 25. This riddle 25 consists in this case of a chain conveyor having on each side a chain of which the links 44 (see FIG. 2) are equipped with retaining walls. Mesh segments or portions are arranged between the two side chains so as to form two endless riddle surfaces parallel to each other.

Figure 3:
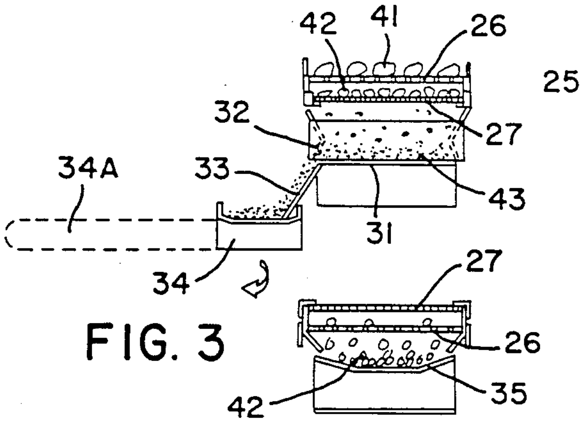

An outer mesh riddle surface 26 is able to retain and discharge terminally any material of a large piece size 41 (see FIG. 3).

The middlings and smalls drop through the transverse mesh segments or portions of the outer riddle surface 26 onto an inner riddle surface 27.

The transverse mesh segments of this inner riddle 27 are of a smaller mesh size and can retain the middlings which form the material to restore the railway road bed. The smalls can pass through the mesh of the inner riddle 27 and fall onto a conveyor 31 for smalls.

At the end of the conveyor 31 is a deflector 32, by which the smalls are sent onto a chute 33 and thence to a further conveyor 34, which delivers the smalls 43 to a hopper 29 or possibly (see position 34A of FIG. 3) to a discharge position outside the railway line 16. The material 41 of a large piece size, being conveyed by the outer riddle 26, falls into the same hopper 29 when it reaches the end of the conveyor riddle 26. Material 41–43 not suitable for recycling is therefore discharged by means of the hopper 29 cooperating with a conveyor 30, which may serve suitable collection wagons or trucks, for instance.

FIG. 1 shows a central trelliswork 24 that forms the intermediate portion of the frame 11 of the machine 10. Drive units 22–23 can also be seen; the unit 22 contains the drive means for the various services, whereas the unit 23 contains the motor for movement of the machine 10. A drive unit 52 for the endless-conveyor riddle 25 is also shown.

The continuous riddle 25 comprises vibrators 28 (see also FIG. 2) to facilitate separation of the materials of different piece sizes.

These vibrators 28 are dimensioned in such a way as to provide the continuous riddle 25 with a particularly efficient amplitude of vibration to suit the specific requirements (for example, separation of mud or dry material, etc.). The vibrators 28 will be insulated advantageously from the remainder of the frame 11 of the machine 10. This will reduce the noise and discomfort for the operators and surroundings.

Figure 2:
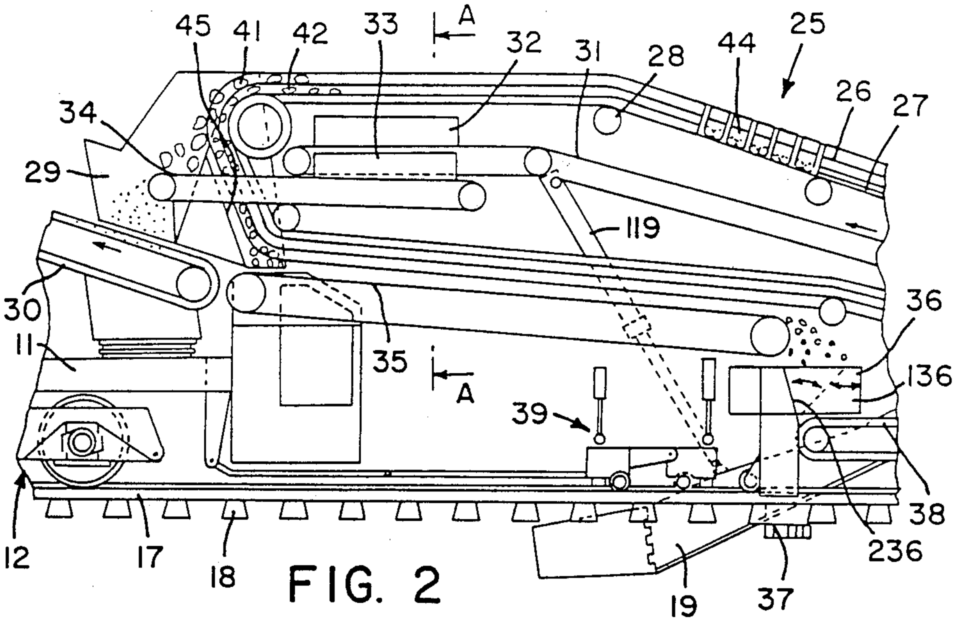

FIG. 2 in particular shows how the restoration material 42 is sent for recycling. It is held between the outer riddle 26 and innner riddle 27, which retains it. When such material 42 reaches the end of the conveyor, it drops owing to the force of gravity and can pass through the larger mesh of the outer riddle 26, being guided by a chute 45 located substantially at the end of the continuous riddle 25. The material 42 thus discharged drops onto a conveyor 35, which sends such material 42 to distributor means 36. The latter 36 comprise a slidable box 136, which allows a greater or smaller quantity of restoration material 42 to fall onto lateral discharge means 37 in the central portion of the machine 10 or onto rear discharge means 38. The latter 38 consist in this case of two conveyors, positioned sideways, which send the restoration material 42 towards the middle or the sides of the line 16 and are capable of being oriented.

A tiltable gate 236 is also provided for better regulation of the outflow of the restoration material 42.

Combination of the displacements of the box 136 and gate 236 enables the restoration material 42 to be laid in a desired and controlled manner either in the zone immediately alongside the rails 17 or in the middle zone between the two rails 17 of the line 16.

FIG. 2 also shows a lifting jack 119 to adjust the height of the excavator chain 19 so that the excavation depth can be varied.

FIG. 3 shows a section along A—A of FIG. 2. This section makes clear the way in which the continuous riddle 25 has two riddle stages or surfaces 26–27 respectively which can retain material 41 of a large piece size and middlings 42.

Instead, the smalls 43 drop onto a conveyor 31, by which they are sent to the conveyor 34 (see also FIGS. 1 and 2) by the deviator 32 and chute 33. If the conveyor 34 is kept in a position parallel to the axis of the machine 10, it discharges the smalls 43 into the hopper 29, and the smalls 43 are then discharged together with the large material 41. If it is desired to separate the smalls 43 from the large material 41, the conveyor 34 can be located in an independent discharge position 34A. In this way the discharge takes place at the side of the line 16, for instance into appropriate collection trucks or onto the ground, whenever this does not cause a public nuisance or a source of dirtiness. This capability makes the machine very versatile.

In fact, this enables large materials 41 and smalls 43 to be recovered separately or eliminated separately.

The machine 10 is also equipped with alignment grippers 40, which serve to keep the line 16 correctly oriented geometrically, that is to say, in accordance with the configuration which the line 16 possessed before the passage of the machine 10.

Figure 4:
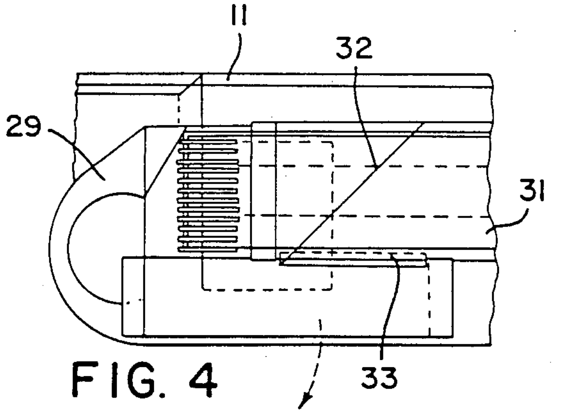

FIG. 4 gives a view from above of the end portion of the smalls conveyor 31 near the hopper 29.

The end portion of the conveyor 31 can be seen to be cooperating with the deflector 32, which consists of an inclined plate, for instance. It is also possible to see the chute 33 by which the smalls 43 are delivered to the conveyor 34, which, as we have noted, can be oriented as desired for discharge into the hopper 29 or outside the rails 17.

Figure 5:
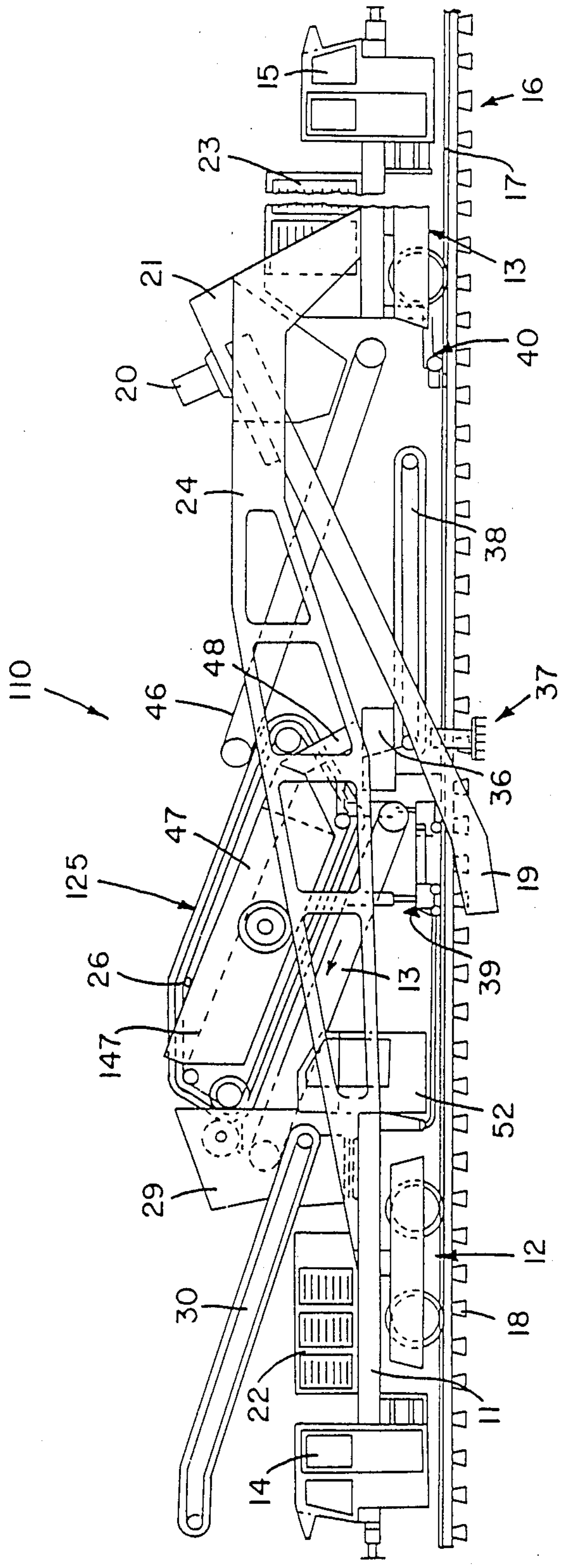

FIG. 5 shows another embodiment of the invention. In this embodiment a machine 110 comprises, in cooperation with the hopper 21 that collects material coming from the excavator chain 19, an elevator conveyor 46, which carries material taken from the road bed to riddle means 125, which in this case include a continuous endless-conveyor riddle 126.

In this embodiment too, vibrators can be included to make a given segment of the upper part of the conveyor riddle 126 vibrate.

This endless-conveyor riddle 126 is positioned around a vibrating riddle 47, which comprises a mesh surface 147 able to retain the middlings 42 for restoration of the road bed.

The material 41 of large piece size is retained by the continuous riddle 126 and sent to the hopper 29 and conveyor 30 as in the first embodiment.

The smalls 43, instead, pass through the mesh of the surface 147 and also pass through the mesh of the lower branch of the continuous riddle 126 running below the vibrating riddle 47. The smalls 43 lastly reach a conveyor 131, which delivers the smalls to the discharge conveyor 30.

The middlings 42 (see FIG. 6) slide down by the force of gravity owing to the slope of the vibrating surface 147 and drop through a terminal chute 48 into the distributor means 36, which are constituted in a manner analogous to the example of FIG. 2.

Figure 6:
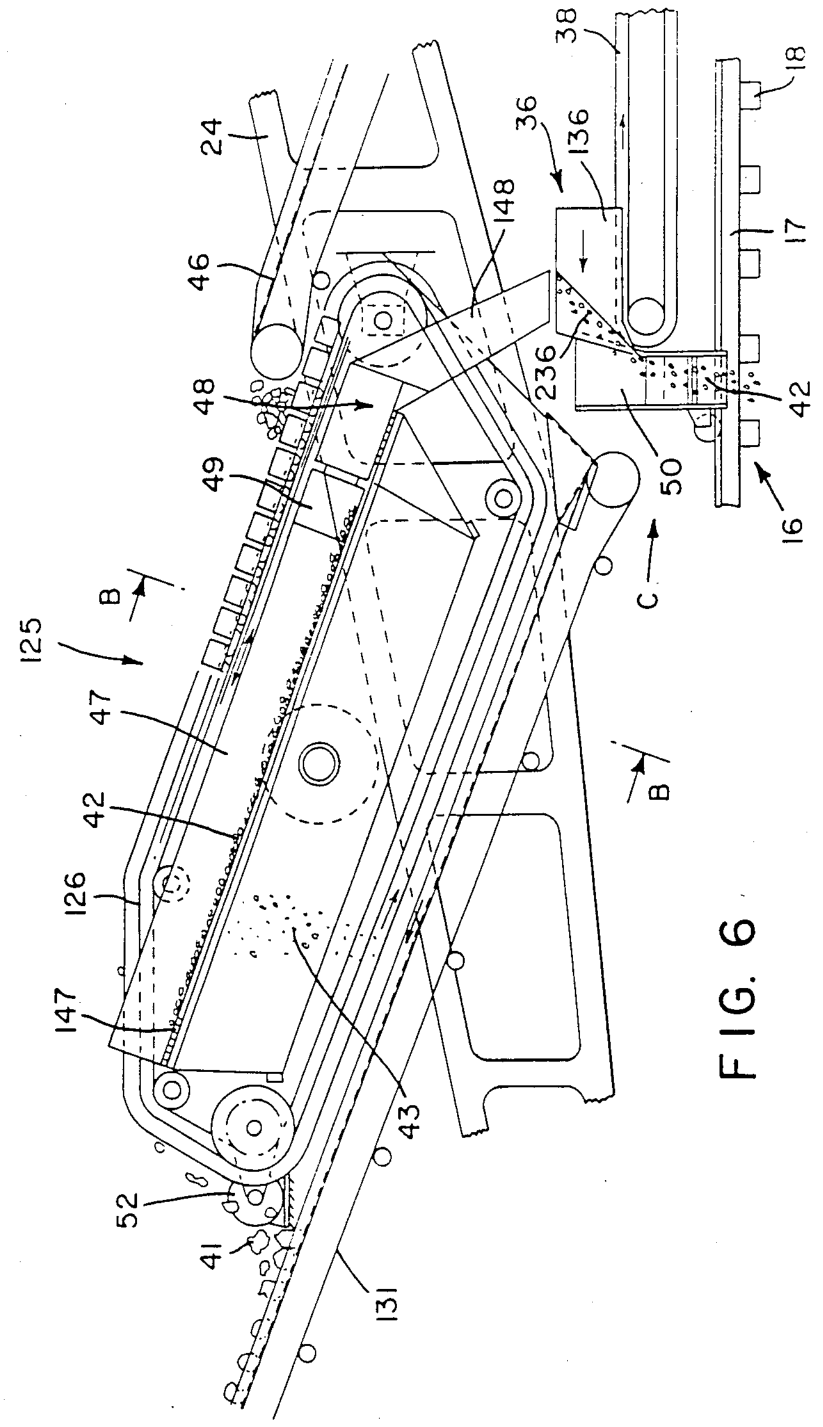
Figure 8:
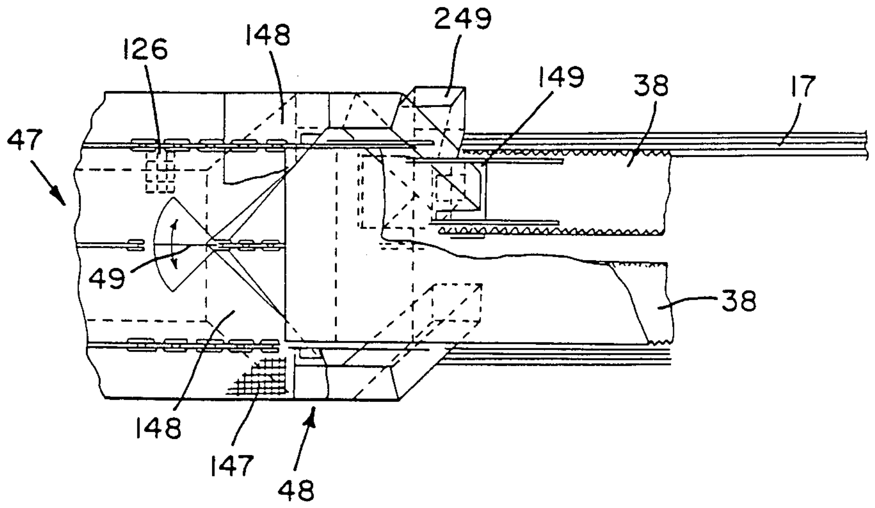
FIG. 8 is a view according to the arrow C of FIG. 6.

As can be seen in FIGS. 6 and 8 in particular, a terminal chuts or funnel 48 is located at the end of the vibrating riddle 47 and comprises two diverging channels 148.

A deviator 49 is located between the two channels 148 and consists of a positionable blade (see FIG. 8 in particular). This deviator 49 enables the middlings 42 to be sent to the righthand or lefthand channel 148 respectively or the quantity of middlings sent to either channel 148 to be dosed by adjustment of its position.

The channel 148 on either side of the machine 10 sends the middlings 42 to the distributor means 36, the gate 236 in this case being solidly fixed to the box 136 (see FIG. 6). It is obvious that by adjusting the position of the box 136 lengthwise to the machine 10 it is possible to apportion the middlings 42 in controlled proportions between the rear orientable conveyors 38 and a hopper 50.

Figure 9:
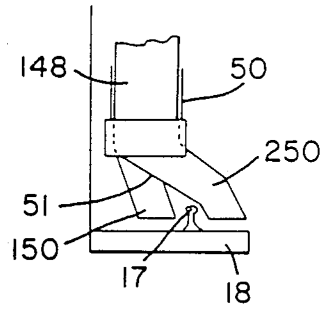
FIG. 9 is a view of distributor means, shown lengthwise to the machine.

This hopper 50 is shown better in FIG. 9 in a view lengthwise to the rails 17 according to the arrow C of FIG. 6. This hopper 50 comprises two outlets, 150 inside the line 16 and 250 outside the rails 17 respectively. A deviator 51, which can be operated by a jack for instance, enables the restoration material 42 to be dosed and apportioned through the outlet 150 and outlet 250 respectively. It is possible to obtain in this way a required division of the middlings 42 by means of the hopper 50, two outlets 150–250, conveyor 38 and distributor means 36.

The description makes evident the outstanding versatility of the riddle 125 of the invention and also the flexible apportionment of the middlings 42.

Figure 7:
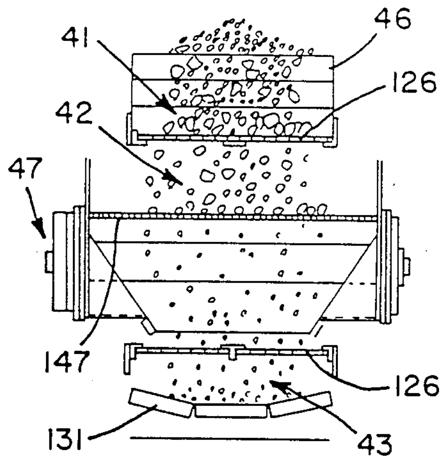
FIG. 7 is a view of the section B—B of FIG. 6.

FIG. 7 gives a view along the section B—B of FIG. 6 and shows the end part of the conveyor 46 from which the material drops onto the continuous endless-conveyor riddle 126. The middlings 42 are retained by the vibrating mesh 147 of the vibrating riddle 47, whereas the smalls 43 fall onto the lower conveyor 131, by which they are discharged.

I claim:

1. A ballast cleaning machine to clean ballast from railway road beds comprising:

(a) a frame mounted on trolleys;

(b) chain excavating means mounted on said frame and extending downwardly therefrom for excavating material from a railway bed;

(c) sorting means comprising an endless chain conveyor which comprises two chains made up of a plurality of links, each link being equipped with a side wall projecting outwardly therefrom, said sorting means further comprising, between pairs of opposing side walls, a foraminous floor and a foraminous partition parallel to, and spaced apart from, said floor, said floor and said partition being fixed to the opposing side walls, said partition retaining oversized material while allowing wanted ballast and smalls to pass therethrough, said floor retaining wanted ballast while allowing smalls to pass therethrough;

(d) smalls conveyor means disposed radially within said endless conveyor for receiving the smalls from said sorting means;

(e) discharge means for receiving the oversized material and smalls and discharging the samd from said machine; and (f) distribution means for receiving said wanted ballast and distributing the same onto the railway bed.

2. A machine as claimed in claim 1, wherein said distribution means comprises at least a slidable box.

3. A machine as claimed in claim 1, wherein said distribution means comprises at least a tiltable gate.

4. A machine as claimed in claim 1, further comprising a delivery conveyor to deliver smalls from the smalls conveyor means to the discharge means.

5. A machine as claimed in claim 4, wherein said delivery conveyor has at least one operating position which is transverse to the smalls conveyor means.

6. A machine as claimed in claim 1, wherein each of said floors and partitions comprises a mesh portion fixedly attached between said pairs of opposing side walls.

7. A machine as claimed in claim 1, wherein side walls attached to adjacent links are not attached directly to each other.

* * * * *

UNITED STATES PATENT AND TRADEMARK OFFICE
CERTIFICATE OF CORRECTION

PATENT NO. : 4,846,282
DATED : July 11, 1989
INVENTOR(S) : Ivo CICIN-SAIN It is certified that error appears in the above-identified patent and that said Letters Patent is hereby corrected as shown below:

Title page:

[73] Assignees: Danieli & C. Officine Mecchaniche SpA; ITI/CLM Impianti Tecnici Industriali SpA.

Signed and Sealed this

Twelfth Day of June, 1990

*Attest:*

HARRY F. MANBECK, JR.

*Attesting Officer* — *Commissioner of Patents and Trademarks*